United States Patent [19]
Saghatchi et al.

[11] Patent Number: 5,305,638
[45] Date of Patent: Apr. 26, 1994

[54] MASS FLOWMETER HAVING NON-ADJUSTABLE FLOW SPLITTER

[75] Inventors: Hamid Saghatchi, Orange; Daniel T. Mudd, Torrance; Charles F. Drexel, Long Beach, all of Calif.

[73] Assignee: DXL International, Inc., Torrance, Calif.

[21] Appl. No.: 854,498

[22] Filed: Mar. 20, 1992

[51] Int. Cl.⁵ .................................................. G01F 5/00
[52] U.S. Cl. ..................................... 73/202; 137/599.1
[58] Field of Search ....................... 73/202, 202.5, 203; 137/599.1; 138/40, 42

[56] References Cited
U.S. PATENT DOCUMENTS

| | | | |
|---|---|---|---|
| 4,800,754 | 1/1989 | Korpi | 73/202 |
| 5,044,199 | 9/1991 | Drexel et al. | 73/202 |
| 5,099,881 | 3/1992 | Nakajima | 73/202 |

*Primary Examiner*—Herbert Goldstein
*Attorney, Agent, or Firm*—Spensley Horn Jubas & Lubitz

[57] ABSTRACT

A split path mass flowmeter includes a housing having a longitudinally extending bore within which a flow splitter is positioned. The flow splitter includes a tapered portion having a taper corresponding generally to that of a tapered portion of the bore. The tapered portion of the flow splitter is nested within the tapered portion of the bore, the tapered portions of these elements thereby forming a self-holding retention section for non-adjustably retaining the flow splitter within the bore. The retention section may taper outwardly or inwardly in the direction of fluid flow. A calibration section may precede or follow the retention section or may be combined into the retention section. Further, a recovery section may be separately disposed downstream of the retention and calibration sections or may be combined along with the calibration function in the retention section.

22 Claims, 4 Drawing Sheets

MASS FLOWMETER HAVING NON-ADJUSTABLE FLOW SPLITTER

BACKGROUND OF THE INVENTION

Cross-Reference to Related Applications

The present invention is related to (1) U.S. patent application Ser. No. 07/437,053 filed Nov. 13, 1989 for "Flowmeter," now U.S. Pat. No. 5,044,199 issued Sep. 3, 1991; and (2) U.S. patent application Ser. No. 07/529,057 filed Sep. 2, 1983 for "Adjustable Laminar Flow Bypass," now U.S. Pat. No. 4,524,616 issued Jun. 25, 1985. These applications and patents are incorporated herein by reference.

FIELD OF THE INVENTION

This invention relates generally to apparatus for measuring the mass flow of fluids such as gases and in particular, to flowmeters for precisely measuring and controlling the mass flow rate of such fluids.

BACKGROUND OF THE INVENTION

The control of the mass flow of gases is important in many industries. During the manufacture of semiconductors, for example, many of the processes require a precise reaction of two or more gases under carefully controlled conditions. Since chemical reactions occur on a molecular level, the control of mass flow is the most direct way to regulate the gases.

Not only is it important that the amount of gas be precisely controlled, but it is important that the gas be free from contamination. In the manufacture of semiconductor devices having features the size of only one micron or less, the presence of any foreign contaminants in the gas stream is extremely undesirable. Particles, vapors and contaminant gases, such as dust, metal, lint, moisture, solvents, oil, air or other process gases can cause spoilage of the products. It is therefore important that the flow splitters used in mass flow meters neither trap such contaminants and subsequently release them to the gas stream, nor generate such contaminants during normal calibration and operation.

There have been developed in the art a variety of instruments for measuring the mass flow rate of gases from below 5 standard cubic centimeters per minute (Sccm) to more than 500,000 SCCM. The prevalent design of such instruments requires that the flow of the gas be divided into two or more paths.

In a typical instrument, a small flow is routed through a sensor assembly where the mass flow is measured, while most of the flow is routed through a flow splitter section located in parallel with the sensor assembly. The sensor assembly contains a capillary tube with two resistance thermometers wound on the outside. The resistance thermometers from two legs of an electronic bridge; the other two legs are usually fixed resistors. The bridge is carefully designed and manufactured such that the two resistors are as identical as possible in electrical and mechanical characteristics. When a voltage is applied across the bridge, current moves through each resistance thermometer causing them to self-heat. When there is no flow of gas through the capillary tube, both of the thermometers heat up identically. As gas begins to flow through the tube, the gas cools the first resistance thermometer and transfers a portion of that heat to the second one, causing it to get warmer. The temperature difference between the two thermometers is a function of mass flow.

Flow through a gap or conduit can be characterized by a non-dimensional parameter known as the Reynold's number. The meaning of Reynold's number is well known in the art and a discussion is found, inter alia, in U.S. Pat. No. 4,524,616, which patent is incorporated herein by reference. The Reynold's number for flow through a conduit can be determined using the formula:

$$R = 4m\pi V_m/\mu$$

where $\pi$ is the density of the fluid, $V_m$ is the mean velocity through the conduit, $\mu$ is the fluid viscosity and m is the hydraulic radius defined as the conduit area divided by the wetted perimeter of the conduit. The effective diameter of the conduit can be considered to be 4 m.

The Reynold's number expresses the ratio of the inertial forces to the viscous forces in the fluid. For low values of R, the flow is laminar, while for high values of R, inertial forces predominate and the flow tends to be turbulent. The Reynold's number corresponding to the transition between laminar and turbulent flow generally occurs in the range of about 1600 to about 2800; i.e., a Reynold's number of less than 1600 may be assumed to enable laminar flow.

The geometry of the capillary tubes used in the sensor assemblies of flow meters is chosen to constrain flow of the fluid to the laminar region, that is, to a Reynold's number less than about 1600. Under laminar flow conditions in the capillary tube, ignoring the effects of secondary kinetic losses and the effects of heat addition from the resistance thermometers, mass flow will be linear with respect to the pressure drop across the capillary tube.

Linearity is a desired quality in mass flow measurement and control. A linear mass flow system greatly simplifies interaction with an instrument's automatic process control systems. In addition, the ability to use a flowmeter on gases different than the gas initially used for calibration enables the user to switch from gas to gas without recalibration, and allows the user to employ a non-hazardous gas to calibrate flowmeters ultimately used on hazardous gases.

Assuming a perfectly linear mass flow sensor assembly using a capillary tube, to obtain a perfectly linear flow measurement, the capillary tube and the flow splitter section should have identical flow characteristics. If they do, the ratio between the flow through the capillary tube and the flow through the flow splitter section remains constant for different gases, temperatures, pressures and mass flow rates. As a result of this constant ratio, total flow can be determined from the measurement of the partial flow through the capillary tube.

If the ratio varies due to differences between the flow characteristics of the two paths, the sensor assembly signal must be electronically modified to compensate for the varying split ratio and to linearize its output with the total flow through, and possibly the temperature of the gas in, the flow meter section. Knowing and making modifications for a varying split ratio, although possible, complicates the measuring task and introduces varying degrees of inaccuracy due to unit to unit manufacturing variation. If the ratio varies with flow rate, the flow through the sensor assembly will not be a true measure of the total flow. The amount of error, when there is not a constant split flow ratio, increases as the ratio becomes more dependent on the flow rate.

A constant ratio can be achieved by creating conditions in which the mass flow rate through the fluid path and the sensor assembly are a linear function of the pressure drop across the fluid inlet and outlet. Given these conditions, the ratio becomes independent of the mass flow rate. The total flow can then be accurately calculated from the measurement of the flow through the sensor assembly over the entire flow range using the formulas:

$$R = \frac{m_B}{m_S} = \frac{k_{B1}\Delta P}{k_{S1}\Delta P} ; R = \frac{k_{B1}}{k_{S1}} = \text{Constant}$$

where: R = the ratio, $k_{B1}$ = the linear flow restriction coefficient due to the geometry of the fluid path, $k_{S1}$ = the linear flow restriction coefficient due to the geometry of the sensor, $\Delta P$ = the pressure drop, $m_B$ = the mass flow rate through the fluid path and $m_S$ = the mass flow rate through the sensor.

If the mass flow through the fluid path is not linear with pressure drop, the ratio no longer simplifies as illustrated above. The gas passing through the fluid path increases in velocity at the expense of pressure as the cross sectional area of the fluid path is reduced or as abrupt changes in flow path direction occur. Therefore, it is a desideratum that, with the exception of linear viscous losses, all the energy contained in the gas velocity (a non-linear quantity) be recovered or converted back into pressure by the time the gas exits the fluid path. The portion that is not recovered is called a kinetic loss and causes the pressure drop across the fluid path to be non-linear with flow. The ratio then takes the form:

$$R = \frac{k_{B1} + f(k_{B2}, \Delta P)}{k_{S1} + f(K_{S2}, \Delta P)}$$

where: $k_{B1}$ = the fluid path's linear flow restriction coefficient, $K_{S1}$ = the sensor's linear flow restriction coefficient, $k_{B2}$ = the fluid path's non-linear flow restriction coefficient, $k_{S2}$ = the sensor's non-linear flow restriction coefficient, and $\Delta P$ = the pressure drop. Since $\Delta P$ varies with flow, the ratio is not constant and, therefore, the sensor assembly output requires electronic modification.

Flow geometries through the sensor assembly and the fluid path are designed to reduce the effects of the non-linear terms on the ratio by constraining the flow conditions to the laminar region. However, disturbing the laminar flow profile of such designs will still create non-linear kinetic losses. Typical disturbances in the laminar flow profile can be caused by sudden contractions and expansions in the fluid path, such as by fluid entrance and exit transitions; by pressure increases due to rapid deceleration of the gas stream in an expanding cross section causing the localized back-flowing of gases; and by momentum changes due to sharp and/or repeated changes in the direction of the fluid flow.

U.S. Pat. No. 3,851,526 discloses a flowmeter in which a laminar flow conduit is connected in parallel with a flow splitter which has a series of disks with radial slots etched into one face. The slots have dimensions such that the gas flow is laminar. However, when these disks are stacked together and held in the flow path with a mounting nut, gas enters the nut, flows first radially outward, then axially, then radially inward and finally, flows axially again. Consequently, this design forces the gas to make four 90 degree turns. A momentum change is associated with each turn. Moreover, there is a sudden expansion as the gas exits the disks. Both factors cause kinetic losses which create non-linearity. The facing surfaces of the disks also trap contaminants (including moisture), so that purging is difficult. Another problem with this design is that the pressure drop depends on the torque of the nut and can be different each time the flow splitter is disassembled and reassembled.

U.S. Pat. No. 3,792,609 discloses a flow splitter which has an orifice followed by a series of closely-packed fine screens. This design also suffers from momentum losses as the gas zigzags its way through the screens.

U.S. Pat. No. 4,524,616 discloses a combination by-pass and sensor in which the flow splitting function is accomplished within the flow splitter section itself. It consists of a tapered flow splitter adjustably secured in a tapered bore in the flowmeter housing, so as to form an annular fluid path. Two boreholes are drilled through the housing to operationally connect the sensor to the bore. The device is adjusted by moving the flow splitter in and out on a threaded shaft. Such an adjusting mechanism contains dead spaces in its threads and shaft, which make purging difficult.

In the preferred embodiment of the device disclosed in U.S. Pat. No. 4,524,616, the boreholes are both connected to the annular region formed between the bore and the flow splitter. This embodiment is expensive to manufacture. Because of the location of the boreholes, the pressure drop through the sensor is very sensitive to the concentricity of the flow splitter in the bore, thus the flow splitter must be concentric with the bore within extremely close tolerances.

In the embodiment of the device of U.S. Pat. No. 4,524,616 in which the two boreholes are located on each side of the annular flow path, there occurs high kinetic losses due to the rapid reduction of static pressure, as the gas enters the annular fluid path, and rapid increase of the static pressure, as it exits. In the embodiment where one borehole is located outside the annular flow area and the other borehole is located inside the laminar flow area, there results a non-linear manometer effect due to the markedly different gas velocities at the boreholes.

U.S. Pat. No. 5,044,199, incorporated by reference, describes an adjustable flow splitter which provides excellent linearity over a wide range of flow rates and a variety of gases, and has certain other advantages as described in the patent.

All of the patents cited above are concerned with flow splitters which are adjustable to vary pressure drop with flow so that mass flow controllers can accommodate different flow rates and different gases with a minimum number of mechanical parts. For example, in U.S. Pat. No. 3,851,526, adjustability is achieved by adding or subtracting washers and in U.S. Pat. No. 3,792,609, adjustability is provided by changing the number of screens. After the gas and maximum flow rate of a mass flow controller has been specified, the flow splitter is adjusted during bench calibration to produce a "standard" pressure drop which is identical for each controller, for instance, 5 inches of water. Therefore, each mass flow controller will have this standard pressure drop at its 100% rated flow, using the particular gas it is destined to control.

Now, however, the state of the art of mass flow controller design has progressed to a point where the sensor assembly and electronics can accommodate a substantial range of pressure drops and still deliver high accuracy.

SUMMARY OF THE INVENTION

It has been found that the technological advances in sensor and electronics design permit the use of fixed flow splitters which do not need to be set for a standard pressure drop but still have advantages over adjustable types. Each non-adjustable splitter can cover a relatively broad range of flow and provides numerous advantages including:

1. Fewer particles caused during assembly. The splitter of aforementioned U.S. Pat. No. 5,044,199, under certain conditions, may cause metal particles to be flaked into the flow stream when the splitter is pressed into place.

2. Lower cost. Non-adjustability permits a simpler design.

3. Better linearity. Elimination of the need for adjustment allows more freedom to optimize the flow path.

4. Better serviceability. The flow splitter may be removed for cleaning and replaced without changing the calibration.

In accordance with the broader aspects of the present invention there is provided, for use in a fluid flowmeter, a flow splitter path including a longitudinally extending bore forming a fluid flow path having a central longitudinal axis. The surface of the flow splitter path defining the bore includes a tapered portion. A flow splitter is positioned within the bore and has an outer surface defining with the bore surface a fluid passage dimensioned to maintain laminar flow therethrough. The outer surface of the flow splitter includes a tapered portion having a taper corresponding generally to that of the tapered portion of the bore surface. The tapered portion of the flow splitter is positioned within the tapered portion of the bore surface. The tapered portions of the bore and flow splitter together form a retention section along the flow splitter path, the flow splitter being non-adjustably retained within the bore at the retention section.

Because the angle of the tapered portions are typically quite small, the friction retention force resulting from the self-holding action of the nested tapered portions is sufficient by itself to securely hold the flow splitter in place within the bore.

Various alternative embodiments of the invention may be provided. For example, the retention section tapers may diverge or converge relative to the central longitudinal axis in the direction of fluid flow. A calibration section may precede or follow the retention section, or may be integrated into the retention section. Similarly, a recovery section may be separately disposed downstream of the retention and calibration sections or may be integrated along with the calibration function in the retention section.

BRIEF DESCRIPTION OF THE DRAWINGS

Further objects, features and advantages of the invention will become apparent from the detailed description, below, when read in conjunction with the accompanying drawings in which.

DETAILED DESCRIPTION OF THE PREFERRED EMBODIMENTS

As required, details of a variety of illustrative embodiments of the invention are disclosed. However, it is to be understood that these embodiments merely exemplify the invention which may take forms different from the specific embodiments disclosed. For example, while the measuring apparatus herein is described with regard to mass flow instruments, the flowmeter incorporating the present invention may also be employed in volume flow instruments or in any instrument where it is desired to take advantage of the linear flow characteristics and cleanliness of the invention. Moreover, while there is disclosed herein certain sequences of calibration, recovery and retention sections along the flow splitter path, and various ways of combining these sections, other sequences and combinations will suggest themselves to those skilled in the art based on the disclosure herein and those alternatives are intended to be encompassed within the appended claims. Accordingly, structural and functional details are not necessarily to be interpreted as limiting, but as a basis for the claims.

Figure 1:
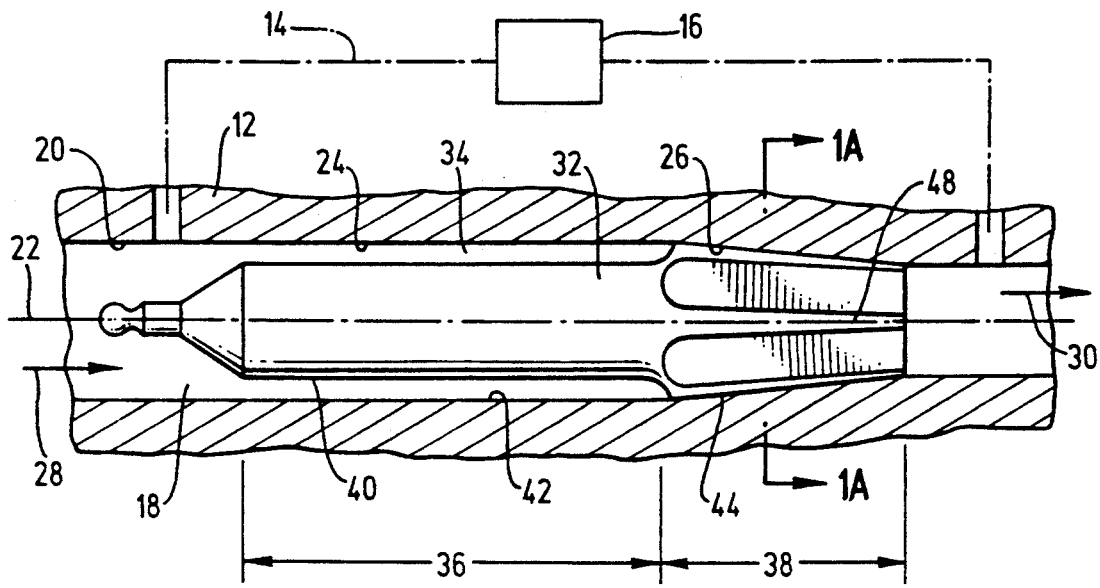
FIG. 1 is a side elevation view, partly in cross section, of a fluid flowmeter flow splitter path in accordance with a first embodiment of the present invention.
Figure 1A:
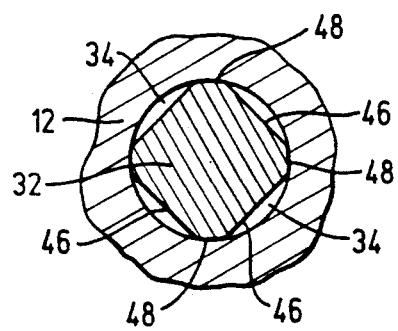
FIG. 1A is a transverse cross section of the flow splitter of FIG. 1 as seen along the plane 1A—1A.

Referring now to FIGS. 1 and 1A, there is shown a portion of a mass flow meter 10 including a housing 12. The flow meter is of the type in which a small portion of the total fluid flow is bypassed, via an elongated capillary path 14, through a sensor assembly 16 in which the mass flow is measured utilizing the techniques described earlier. The main part of the fluid flow is routed through a longitudinal flow splitter path 18 in parallel with the sensor assembly path 14. The flow splitter path 18 is defined by a bore 20 having a longitudinal axis 22 and a wall 24 which is cylindrical except for a tapered portion 26. In the embodiment under consideration, the portion 26 tapers inwardly, that is, toward the longitudinal axis 22, in the direction of fluid flow as indicated by the upstream and downstream arrows 28 and 30, respectively.

Positioned within the bore 20 is a flow splitter 32 defining with the bore wall 24 a passage 34 extending the length of the flow splitter and so configured as to maintain laminar fluid flow throughout the passage.

The flow splitter 32 defines two sections along the flow splitter path, a calibration section 36 and a combined pressure recovery/retention section 38 downstream of the calibration section. The calibration section 36 is formed by cylindrical portions 40 and 42 of the flow splitter 32 and bore wall 24, respectively. The annular gap thus formed in the calibration section between the splitter and the bore wall is dimensioned in both length and width to assure that the gas flow is laminar, as earlier described.

The combined pressure recovery/retention section 38 is defined by the tapered portion 26 of the bore wall and a correspondingly tapered portion 44 of the flow splitter, the latter tapered portion being nested within the tapered bore wall portion. The self-holding action of the nested tapered portions acts as a means of retention non-adjustably securing the flow splitter 32. The angle of the taper is controlled by the friction angle and the force desired to move the flow splitter; the smaller the angle the greater the retention force. Convenient angles may include any of the standard machine tool tapers, such as the Morse taper for holding machine tools, since standard tooling to make these tapers is widely available. Typically, these tapers range between 0.25 and 0.75 inch per twelve inches length providing included angles from about 1.2 to 3.5 degrees. The smaller angle results in a more secure retention of the flow splitter.

Fluid flow passages 34 through the recovery/retention section are provided by multiple flats or flutes 46 formed between fins 48 in the tapered portion of the flow splitter and so dimensioned that the flow passes through increasingly larger cross sectional areas to thereby reduce the velocity of the fluid to recover the kinetic energy created by acceleration of the gas from the bore inlet (upstream of the calibration section) to the calibration section. The fluid flow passages in the recovery/retention section may be configured in accordance with the diffuser designed criteria described in R. D. Blevins, *Applied Fluid Dynamic Handbook*, 1984, chapter 7.

Figure 2A:
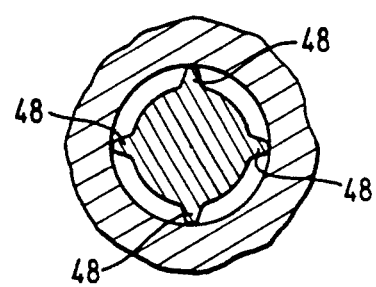
FIG. 2A is a transverse cross section view of the flow splitter of FIG. 2 as seen along the plane 2A—2A.
Figure 2:
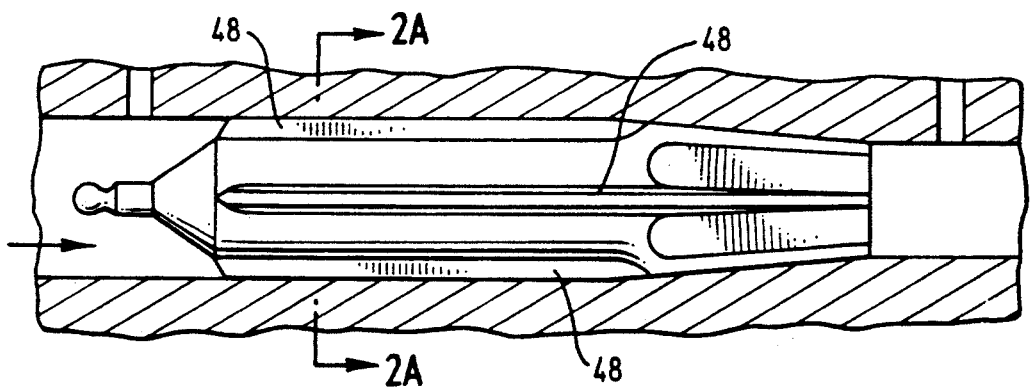
FIG. 2 is a side elevation view, partly in cross section,, of a flow splitter path in accordance with an alternative embodiment of the invention.

The critical portion of the embodiment of FIG. 1 is the transition of the gas from the calibration section to the recovery/retention section. Care must be taken to avoid stalls in the gas flow around the leading edges of the fins defined by the flutes 46. The alternative embodiment of FIGS. 2 and 2A minimizes this problem by extending the fins 48 forwardly to the beginning of the calibration section where the velocity is low and turbulence from stalls have time and space to wash out. In the embodiment of FIG. 2, the portion of the fins along the calibration section should preferably not touch the bore wall for ease of assembly. Other than the extended fins, the embodiment of FIGS. 2 and 2A is identical to that in FIGS. 1 and 1A.

Since the purpose of the flow splitter is to create a linear pressure drop as described earlier, the loss of kinetic energy is the most important consideration. According to the *Applied Fluid Dynamic Handbook* referenced earlier, diffuser effectiveness is largely governed by the degree to which the flow conforms to the diffuser walls. Therefore, the angle of divergence of the diffuser, its length to width ratio and the entrance condition are the key physical considerations. These in turn are limited by the manufacturing methods available to produce the required tolerances. The configurations shown in FIGS. 1 and 2 are effective and economical to make. However, other configurations are possible and some of these will now be described.

Figure 3:
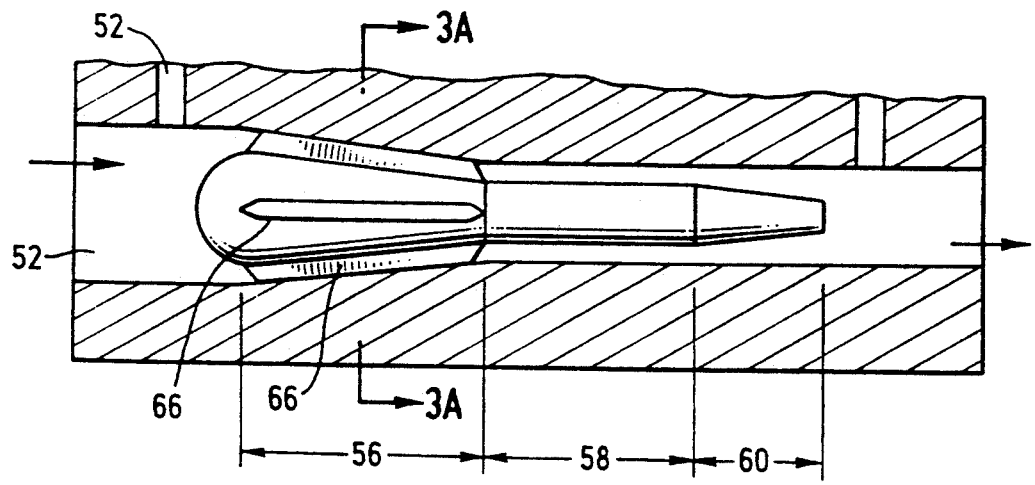
FIG. 3 is a side elevation view, partly in cross section, of a flow splitter path in accordance with another alternative embodiment of the invention.

Referring now to FIG. 3, there is shown a portion of a flow meter housing 50 having sensor assembly bypass taps 52 and 54 for the purpose already described. The housing 50 includes a longitudinal bore 52 having a flow splitter 54 positioned therein. In this embodiment, a retention section 56 is provided upstream of a calibration section 58 which, in turn, is followed by a separate recovery section 60. As before, the retention section 56 is formed by tapered portions 62 and 64 of the bore and flow splitter, respectively. The tapered portion of the flow splitter includes a plurality of projecting fins 66 whose outer extremities 68 have a taper matching that of the bore wall and, when the flow splitter is pressed into place from the inlet end of the bore, serve to non-adjustably secure the flow splitter in place within the bore. The fluid passages 70 between the fins 66, and the fins themselves are configured and dimensioned to minimize the pressure drop across the retention section. In this connection (and this holds true for all of the embodiments disclosed herein) it will be understood that the taper of the surface of the flow splitter in the retention section corresponds generally to that of the bore wall and that by this is meant that said tapers can be identical or can depart from each somewhat (either converging or diverging relative to each other in the direction of flow) to achieve the desired flow characteristics.

Figure 3A:
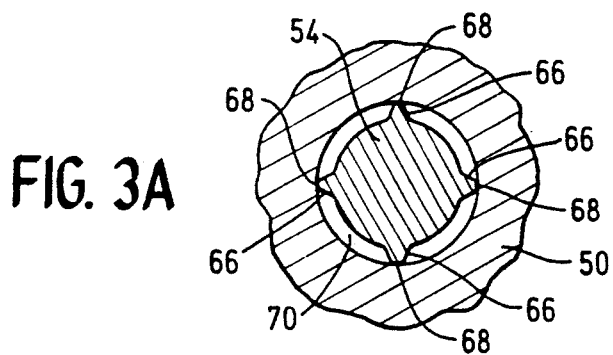
FIG. 3A is a transverse cross section view of the flow splitter of FIG. 3 as seen along the plane 3A—3A.

In the embodiment of FIGS. 3 and 3A, the calibration section (as in the embodiments of FIGS. 1 and 2) is defined by cylindrical portions 72 and 74, respectively, of the bore wall and flow splitter. The flow splitter surface in separate recovery section 60 converges in the direction of flow to provide the desired diffuser action. The embodiment of FIGS. 3 and 3A has the advantages of a smooth flow transition from the calibration section to the recovery section and a low gas velocity where the flow divides around the retention fins 66.

Figure 4:
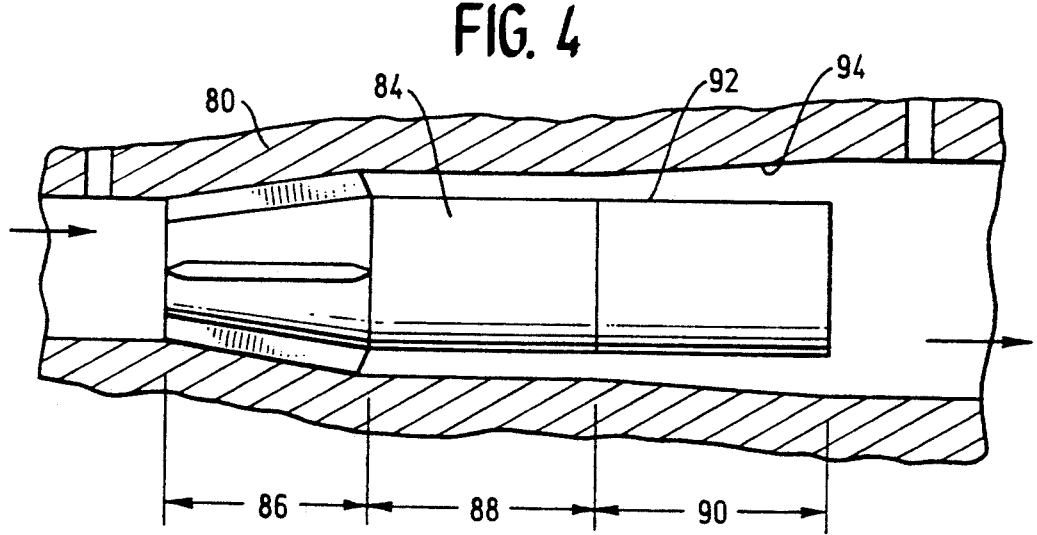
FIGS. 4–9 are side elevation views, partly in cross section, of six other embodiments of the invention.

FIG. 4 shows another embodiment of the invention in which a flow meter housing 80 has a bore 82 defining a flow splitter fluid path incorporating a flow splitter 84. This embodiment, like that of FIG. 3, includes—beginning at the upstream end of the bore—a retention section 86, a calibration section 88, and a recovery section 90. The retention section 86, however, diverges, that is, tapers outwardly in the direction of fluid flow. In this way, the flow splitter may be installed from the downstream end of the bore. The calibration section 88, as before, is cylindrical but unlike the embodiment of FIG. 3 the recovery section 90 is formed by a cylindrical portion 92 of the flow splitter (which may simply be an extension of the cylindrical calibration section) and a diverging portion 94 of the wall of the bore 82. The basic design principles already described apply to this embodiment.

Figure 5:
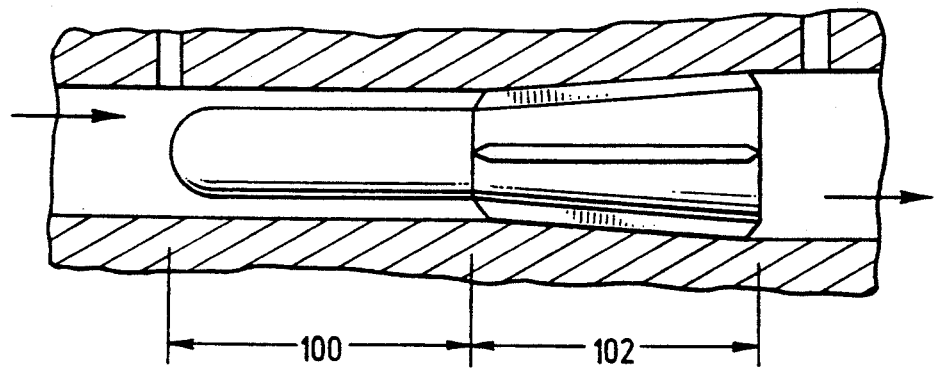

The alternative embodiment of FIG. 5, like that of FIGS. 1 and 2, includes a cylindrical calibration section 100 followed by a combined recovery/retention section 102. The principle distinction is that the taper of the recovery/retention section 102 diverges in the direction of flow so that the flow splitter can be installed from the downstream end of the bore.

Figure 6:
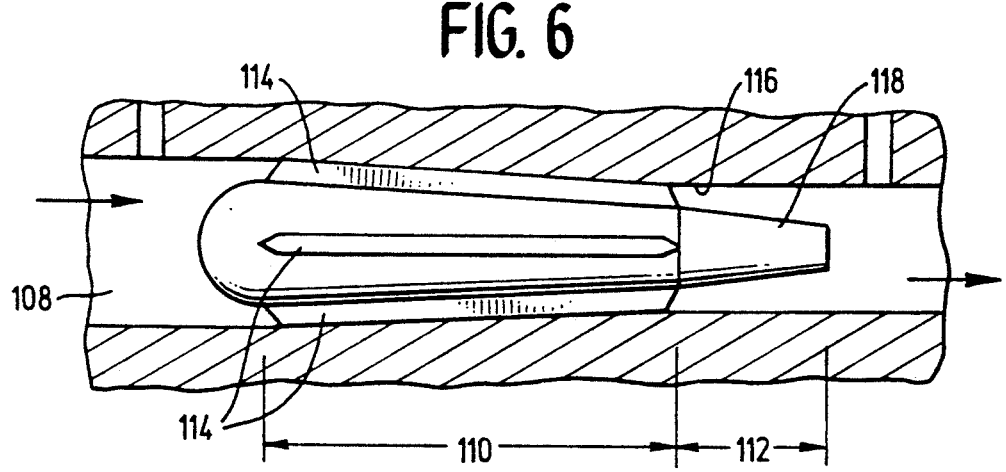

FIG. 6 shows yet another embodiment including a longitudinally extending bore 108. Here, the flow splitter path includes two sections, a combined calibration/retention section 110 and a recovery section 112. The section 110 is tapered, converging in the direction of flow, and includes a plurality of projecting flow guide/retention fins 114 which hold the flow splitter in place in non-adjustable fashion as already described. Since the tapered section 110 converges in the direction of flow, the flow passages in that section must increase in depth in the direction of fluid flow, although the flow area can remain constant. The recovery section 112 is defined by a cylindrical portion 116 of the bore 108 and a converging portion 118 of the flow splitter, the angle of convergence of the recovery section being somewhat steeper than the angle of the taper of the calibration/retention section 110.

Figure 7:
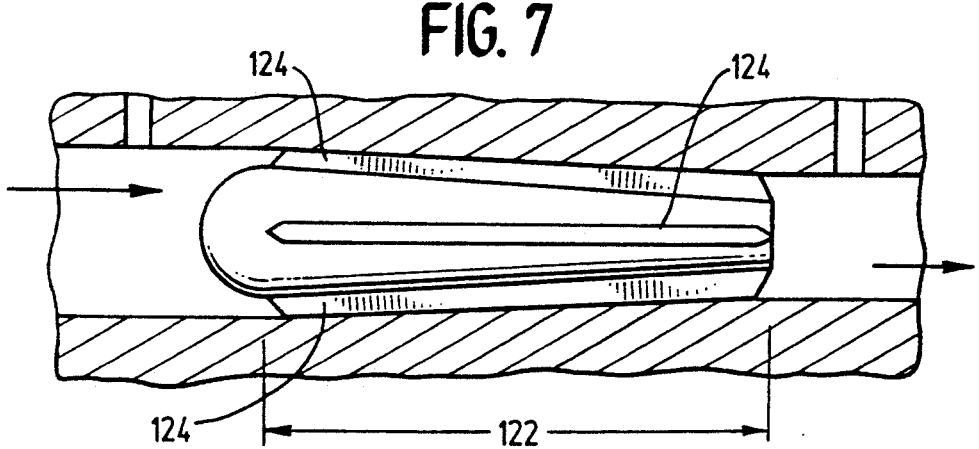

FIG. 7 illustrates an embodiment having a single tapered section 122 combining the calibration, recovery and retention functions. Fins 124 retain the flow splitter and provide flow guidance. The taper converges, that is, slopes inwardly in the direction of fluid flow. To achieve recovery, the flow area of the passages between the fins 124 must increase in the direction of flow; this can be achieved by progressively increasing the depth of the passages.

Figure 8:
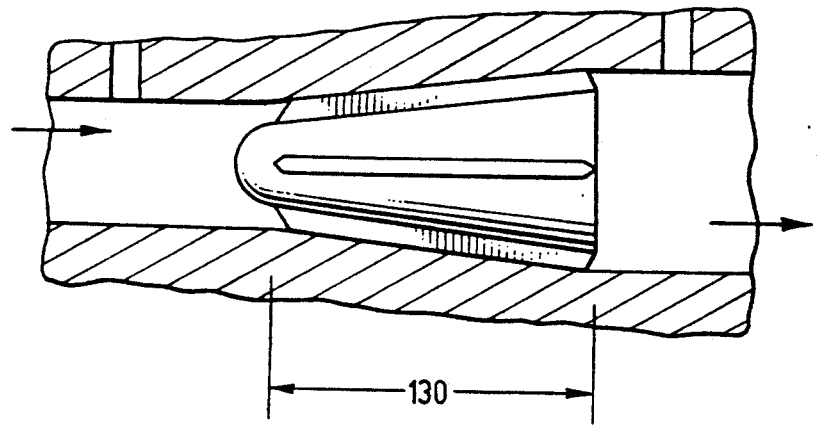

Like the embodiment of FIG. 7, the embodiment of FIG. 8 includes a single tapered section 130 combining all three calibration, recovery and retention functions. In the embodiment of FIG. 8, however, the section 130 diverges in the direction of fluid flow so that the flow splitter is installable from the outlet or downstream end of the bore. A cylindrical calibration section may be added upstream of the tapered section 130 to isolate the calibration function; this embodiment would then resemble that of FIG. 5. Such a modification may improve manufacturability in that the tapered section could be the same for any flow range; it would only be necessary to change the diameter of the calibration cylinder of the flow splitter to accommodate a wide range of flow rates.

Figure 9:
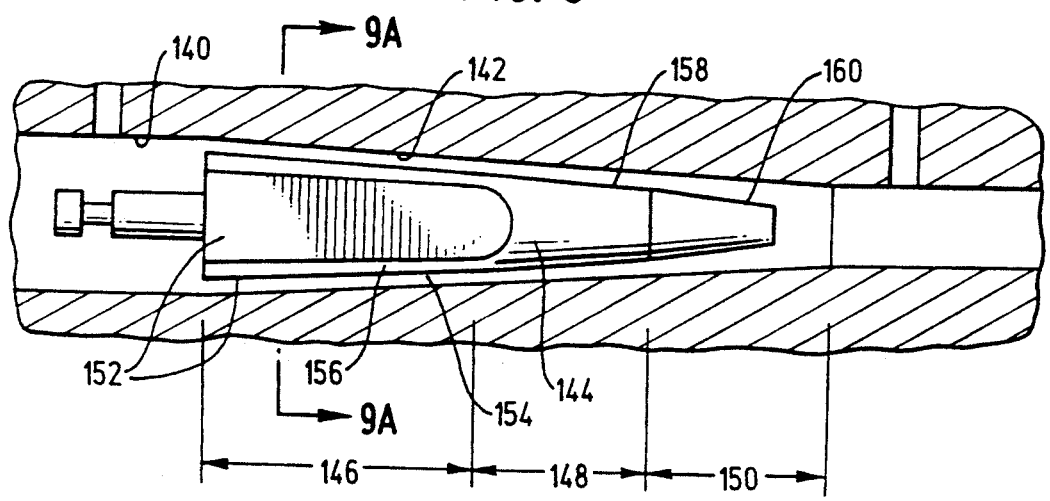
Figure 9A:
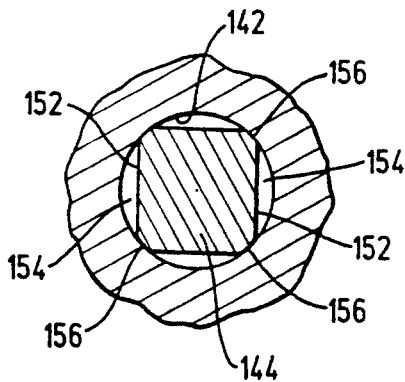
FIG. 9A is a transverse cross section of the embodiment of FIG. 9 as seen along the plane 9A—9A.

FIGS. 9 and 9A show yet another embodiment of the invention which is especially useful for high gas flows. This embodiment includes a bore 140 having a tapered section 142 enclosing a flow splitter 144. The tapered bore wall 142 and flow splitter define a retention section 146, a calibration section 148 and a recovery section 150. The retention section 146 includes flats 152 formed on the flow splitter 144 which define flow passages 154. Retention surfaces 156 on the flow splitter 144 have tapers matching that of the bore taper providing the self-holding action already described. Although the taper of the bore wall 142 shown in FIG. 9 is uniform along its entire length, it will be understood by those skilled in the art that in order to achieve the precise flow characteristics required in the various sections this need not be the case. For example, the outer surface 158 of the flow splitter in the calibration section converges toward the recovery section 150 and may have a taper matching that of the bore or, alternatively, either or both of the tapered bore wall and flow splitter surface 158 may be made to diverge slightly to maintain a constant flow area and a constant pressure drop. The portion of the flow splitter in the recovery section 150 has a surface 160 converging in the flow direction at an angle substantially greater than that of the bore taper so as to provide the required expansion and pressure recovery.

What is claimed is:

1. In a fluid flowmeter, a flow splitter path comprising:
   a surface defining a bore forming a longitudinal fluid flow path having a central longitudinal axis, said surface including a tapered portion tapering in the direction of fluid flow through the flowmeter; and
   a flow splitter disposed within said bore, said flow splitter having an outer surface defining with said bore surface a fluid passage dimensioned to maintain laminar flow therethrough, the outer surface of said flow splitter including a tapered portion having a taper corresponding generally to that of the tapered portion of the bore surface, the tapered portion of the flow splitter being disposed within the tapered portion of said bore surface, the tapered portions of the bore surface and flow splitter forming a retention section along said flow splitter path, said flow splitter being non-adjustably retained within said bore at said retention section, said retention section comprising the sole means for retaining and locating the flow splitter relative to the bore, said bore surface and said flow splitter further defining a calibration section adjacent the retention section.

2. A flow splitter path, as defined in claim 1, in which:
   the tapered portion of the flow splitter is nested within the tapered portion of the bore surface, the self-holding action of the nested tapered portions retaining said flow splitter in place within said bore.

3. A flow splitter path, as defined in claim 2, in which:
   the tapered portion of the flow splitter includes a plurality of outwardly projecting, longitudinal fins engaging the tapered portion of the bore surface, the fins defining fluid flow passages through the retention section.

4. A flow splitter path, as defined in claim 2, in which:
   the tapered portion of the flow splitter includes a plurality of flutes defining fluid flow passages through the retention section.

5. A flow splitter path, as defined in claim 1, in which:
   the tapered portions of said bore surface and said flow splitter taper outwardly relative to the longitudinal axis in the direction of fluid flow.

6. A flow splitter path, as defined in claim 1, in which:
   the tapered portions of said bore surface and said flow splitter taper inwardly relative to the longitudinal axis in the direction of fluid flow.

7. A flow splitter path, as defined in claim 1, in which:
   said calibration section is upstream of said retention section.

8. A flow splitter path, as defined in claim 1, in which:
   said calibration section is downstream of said retention section.

9. A flow splitter path, as defined in claim 7 or 8, in which:
   the calibration section includes a plurality of longitudinally extending fluid flow guide fins.

10. A flow splitter path, as defined in claim 7 or 8, in which:
    said bore surface and said flow splitter define a recovery section.

11. A flow splitter path, as defined in claim 10, in which:
    said recovery section is downstream of said calibration section.

12. A flow splitter path, as defined in claim 7 or 8, in which:
    the calibration section is defined by substantially cylindrical portions of the bore surface and flow splitter.

13. A flow splitter path, as defined in claim 7 or 8, in which:
    the tapered portions of said bore surface and flow splitter taper outwardly relative to the longitudinal axis in the direction of fluid flow.

14. A flow splitter path, as defined in claim 7 or 8, in which:
    the tapered portions of said bore surface and said flow splitter taper inwardly relative to the longitudinal axis in the direction of fluid flow.

15. In a fluid flow meter, a flow splitter path comprising:
- a surface defining a bore forming a longitudinal fluid flow path having a central longitudinal axis, said surface including a tapered portion tapering in the direction of fluid flow through the flowmeter; and
- a flow splitter disposed within said bore, said flow splitter having an outer surface defining with said bore surface a fluid passage dimensioned to maintain laminar flow therethrough, the outer surface of said flow splitter including a tapered portion having a taper corresponding generally to that of the tapered portion of the bore surface, the tapered portion of the flow splitter being disposed within the tapered portion of said bore surface, the tapered portions of the bore surface and flow splitter forming a retention section along said flow splitter path, said flow splitter being non-adjustably retained within said bore at said retention section, said retention section comprising the sole means for retaining and locating the flow splitter relative to the bore, at least a portion of the retention section comprising a calibration section, said bore surface and said flow splitter further defining a recovery section.

16. A flow splitter path, as defined in claim 15, in which:
at least a portion of the retention section further includes said recovery section.

17. A flow splitter path, as defined in claim 15 or 16, in which:
the tapered portions of the bore surface and flow splitter defining said retention section taper outwardly relative to the longitudinal axis in the direction of fluid flow.

18. A flow splitter path, as defined in claim 15 or 16, in which:
the tapered portions of the bore surface and flow splitter defining said retention section taper inwardly relative to the longitudinal axis in the direction of fluid flow.

19. A flow splitter path, as defined in claim 15, in which:
said recovery section is downstream of said retention and calibration sections.

20. A flow splitter path, as defined in claim 15, in which:
the tapered portion of the flow splitter is nested within the tapered portion of the bore surface, the self-holding action of the nested tapered portions retaining said flow splitter in place within said bore.

21. A flow splitter path, as defined in claim 20, in which:
the tapered portion of the flow splitter includes a plurality of outwardly projecting, longitudinal fins engaging the tapered portion of the bore surface, the fins defining fluid flow passages through the retention section.

22. A flow splitter path, as defined in claim 20, in which:
the tapered portion of the flow splitter includes a plurality of flutes defining fluid flow passages through the retention section.

* * * * *